(12) United States Patent
Kurki

(10) Patent No.: US 6,323,975 B1
(45) Date of Patent: Nov. 27, 2001

(54) OPTICAL ADD/DROP DEVICE

(75) Inventor: Jouko Kurki, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/435,747

(22) Filed: Nov. 8, 1999

(30) Foreign Application Priority Data

May 13, 1997 (FI) ..................................... 972023

(51) Int. Cl.$^7$ ..................................... G02B 6/02
(52) U.S. Cl. .................. 359/127; 359/128; 359/133; 359/138; 359/173; 359/161; 359/163; 359/110; 385/10; 385/37; 385/129; 385/43; 385/24
(58) Field of Search .................. 359/127, 128, 359/133, 138, 173, 161, 163, 110; 385/10, 37, 129, 43, 24, 27

(56) References Cited

U.S. PATENT DOCUMENTS

| | | | | |
|---|---|---|---|---|
| 5,500,756 | * | 3/1996 | Tsushima et al. | 359/174 |
| 5,717,795 | * | 2/1998 | Sharma et al. | 385/24 |
| 5,726,785 | | 3/1998 | Chawki et al. | 359/125 |
| 5,805,751 | * | 9/1998 | Kewitsch et al. | 385/43 |
| 5,889,899 | * | 3/1999 | Henry et al. | 385/10 |
| 5,914,794 | * | 6/1999 | Fee et al. | 359/110 |
| 5,915,051 | * | 6/1999 | Damask et al. | 385/16 |
| 6,134,036 | * | 10/2000 | Andreozzi et al. | 359/127 |

FOREIGN PATENT DOCUMENTS

| | | |
|---|---|---|
| 0 651 520 | 5/1995 | (EP) . |
| 4337089 | 5/1995 | (DE) . |
| 0730172 | 9/1996 | (EP) . |
| 0743772 | 11/1996 | (EP) . |
| 0 796 909 | 3/1997 | (EP) . |
| WO 9609703 | 3/1996 | (WO) . |

OTHER PUBLICATIONS

International Search Report for PCT/FI98/00407.

* cited by examiner

Primary Examiner—Leslie Pascal
Assistant Examiner—Chau M. Nguyen
(74) Attorney, Agent, or Firm—Altera Law Group, LLC

(57) ABSTRACT

The invention relates to an optical add/drop device comprising at least two optical filter units (OADE). An individual filter unit comprises a first, second and third port so that when all signals of the aggregate signal are present at the first port (A), said desired signal is present at the second port (B) and all other signals except the desired signal are present at the third port (C). To provide flexible altering possibilities, a number of filter units (OADDE . . . OADE) are placed in succession to form at least two pairs of filter units in such a way that in each pair the first filter unit operates at a given wavelength as a signal dropping unit and the second as an adding unit corresponding to the first unit, adding to the aggregate signal a signal having the same wavelength. Furthermore, the device comprises for each pair an optical switching element (SW) having at least two positions and being connected to the filter units of the corresponding pair in such a way that in its first position it switches the second port (B) of the dropping filter unit to the second port (B) of the corresponding add filter unit, and its second position the transmitter means to the second port (B) of the add unit and the receiver means to the second port (B) of the drop unit.

6 Claims, 4 Drawing Sheets

OPTICAL ADD/DROP DEVICE

FIELD OF THE INVENTION

The invention relates generally to optical data transmission, particularly to an optical add/drop device used in an optical data transmission system.

BACKGROUND OF THE INVENTION

Wavelength division multiplexing (WDM) is an efficient way of multiplying the capacity of optical fibre. In wavelength division multiplexing, several independent transmitter-receiver pairs use the same fibre. FIGS. 1a and 1b illustrate the principle of wavelength division multiplexing, using as an example a system having four parallel transmitter-receiver pairs. Each of the four information sources (not shown in the figure) modulates one of four optical transmitters, each of which generates light at a different wavelength ($\lambda_1 \ldots \lambda_4$). As will be seen from FIG. 1a, the modulation bandwidth of each source is smaller than the distance between the wavelengths, and thus the spectra of the modulated signals do not overlap. The signals generated by the transmitters are combined onto the same optical fibre OF in a WDM multiplexer WDM1, which is a fully optical (and often passive) component. At the opposite end of the fibre, a WDM demultiplexer WDM2, which is also a fully optical (and often passive) component, separates the different spectral components of the combined signal from one another. Each of these signals is detected at a discrete receiver. Hence, a narrow wavelength window is assigned for the use of each signal in a given wavelength range. A typical practical example might be a system where the signals are in the 1550 nm wavelength range for example in such a way that the first signal is at the wavelength 1544 nm, the second signal at the wavelength 1548 nm, the third signal at the wavelength 1552 nm and the fourth signal at the wavelength 1556 nm. Nowadays a multiple of 100 GHz (approx. 0.8 nm) is becoming the de facto standard for the distance between wavelengths.

In order to enable a given wavelength channel to be branched off a transmission link using wavelength division multiplexing or a given wavelength channel to be added thereinto, an element called an add/drop filter has been developed. The task of an optical add/drop filter is (1) to direct off a selected narrow-band channel (wavelength) from the optical aggregate signal that passes in the fibre incoming to the filter (drop function) and/or (2) to add to the fibre outgoing from the filter a narrow-band channel (add function). The signals (wavelengths) that have not been selected for dropping pass through the add/drop element from the incoming fibre to the outgoing fibre. Thus a desired narrow-band channel is added or dropped in the filter without otherwise affecting the spectrum of the optical aggregate signal in any way.

FIG. 2 illustrates the structure of a known three-port add/drop filter OADE. References L1 . . . L3 denote port-specific lenses and reference F an interference filter. The incoming fibre is connected to port A, through which a number of wavelength channels ($\lambda_1 \ldots \lambda_4$) arrive. One of the wavelength channels (in this example $\lambda_1$) passes through the interference filter F (and lenses L1 and L2) to port B. The remaining wavelength channels also pass through lens L1 but are reflected from the interference filter (through lens L3) to port C. The wavelength of the channel entering port B is a fixed, filter-specific constant.

The filter operates in both directions, and hence the adding function is achieved in such a way that the existing channels are fed to port C and a channel to be added to port B, and hence all channels are obtained from port A.

A three-port filter of the kind described above is manufactured for example by Optical Corporation of America, U.S.A.

The present-day optical telecommunications systems based on wavelength division multiplexing are point-to-point transmission systems, but optical transmission technology is being constantly developed to implement the lowest layers of broadband network architectures in the form of fully optical systems by means of which the transmission of high-capacity information streams can be handled fully optically (by means of an optical cross-connect). After point-to-point systems, optical networks suitable for add/drop operations—such as ring networks—constitute the next phase in this evolvement path. To make it possible to flexibly configure such networks in accordance with traffic needs, add/drop filters are replaced by network elements in which the wavelengths to be dropped/added can be selected. Such a network element will be termed an add/drop device in the following. In other words, an add/drop device is a network element that can be so configured that the wavelengths to be dropped/added are selectable.

One optical ring network and the add/drop device used therein is disclosed in European Patent Application 0 651 520. Since the add/drop device in accordance with the present invention is also used in a corresponding optical ring network, such a ring network will be briefly described in the following with reference to FIG. 3. In the exemplary case of FIG. 3, the network is used for the transmission of SDH (Synchronous Digital Hierarchy) signals, but the type of the signal carried by each wavelength may naturally vary. The signal may also be for example a PDH (Plesiochronous Digital Hierarchy) signal or an ATM (Asynchronous Transfer Mode) signal.

The ring network in this exemplary case comprises four nodes consisting of add/drop devices OADM1 . . . OADM4. An optical transmission connection is provided between the nodes, said connection being implemented with optical fibres OF, and the above-described wavelength division multiplexing is used in each one-way link between any two nodes. In this example, four wavelengths ($\lambda_1 \ldots \lambda_4$) and one management wavelength ($\lambda_m$) are used, but it is to be understood that the number of wavelengths used in the network may vary and can also be much greater. Each add/drop device may have an interface to the control system ONC of the device and/or of the entire optical network, through which the configuration of all add/drop devices in the network can be set.

The management system is otherwise located in the SDH equipment, but the configuration of the add/drop multiplexers can be handled through the optical network management system. The optical signal arriving from an SDH device is connected to the ring network at the desired wavelength. In accordance with traffic needs, the desired number of wavelengths is set between the nodes. In other words, the routing configuration of the signals corresponding to the different wavelengths can be altered in accordance with the traffic situation. By means of a management signal travelling at the management wavelength, the nodes are configured in such a way that the desired wavelengths are dropped/added in each node. As is shown in the figure for node OADM1, a drop element MCD can be dedicated for the management wavelength of the node in each transmission direction, said element dropping the management channel operating at the management wavelength Am into the node control unit CU, which again converts the signal into electrical form and controls the add/drop part AD of the node as indicated by the management signal in such a way that the desired channels are dropped into the SDH equipment and the desired channels are added from the SDH equipment. In addition to the drop element, each transmission direction has an add element MCA that adds the management channel arriving from the control unit CU to the outgoing signal leaving the node.

Node management may also take place directly via a local management interface (optical or electrical) in such a way that the management of each node is performed separately through a local interface, or both a local management interface and a network management channel can be used for node management in such a way that a signal can be connected via the local management interface onto the network management channel.

At every wavelength, for example an STM-N (Synchronous Transport Module) signal, such as an STM-16 signal (N=16), can be transported. In the example of FIG. 3, it has been simply presumed that wavelength $\lambda_1$ corresponds to SDH device SDH1, wavelength $\lambda_2$ corresponds to SDH device SDH2, wavelength $\lambda_3$ corresponds to SDH device SDH3 and wavelength $\lambda_4$ corresponds to SDH device SDH4.

The ring network may further comprise a protection system implemented with optical switches, so that when there is a failure on a link between two nodes, a transmission connection can be established through the remaining ring.

In the European patent application referred to above, in the add/drop device serving as a node in the ring network, incoming fibre is connected to an optical demultiplexer that separates each incoming wavelength onto a discrete optical conductor. The output side of the device has an optical multiplexer, and several optical conductors each transferring a specific wavelength are connected as inputs thereof. The multiplexer combines the incoming wavelength channels onto the outgoing fibre.

One drawback of such an add/drop device is that it does not allow flexible implementation of changes in the system, such as addition of wavelength channels. This is due to the fact that the wavelength channels are separated in the same demultiplexer component and are combined in the same multiplexer component, in which the number of wavelengths and the wave length values are preset parameters. Hence, the multiplexers and demultiplexers of the add/drop devices must be changed for example when it is desired to add one channel to the system.

SUMMARY OF THE INVENTION

It is an object of the invention to remove the above-described drawback and to provide an add/drop device having a basic structure that enables changes in the system, such as adding of channels, to be implemented with maximum simplicity and flexibility.

This object is achieved with the solution defined in the independent claim.

The idea of the invention is to place several simple filter units dropping/adding a fixed wavelength channel in succession in such a way that some of them serve as drop units and some as add units forming pairs with the drop units, each pair operating at a specific wavelength. Furthermore, the idea is to use optical switches that can be steered between two positions in such a way that in its first position, a switching element switches the branched channel of the drop filter unit directly to the branched channel of the corresponding add filter unit, and in its second position switches the branched channel of the drop filter unit to the receiver means and the transmitter means to the branched channel of the corresponding add filter unit. In this way, a node device that can be flexibly changed and configured is achieved.

On account of the solution in accordance with the invention, channels can be added to the system by adding one or more filter units or pairs of filter units to the filter unit chain of the add/drop device. The number of pairs is preferably the same as the number of traffic wavelength channels to be transported in the system in each case.

Since the filtering off and combination of wavelength channels does not take place within the same demultiplexerlmultiplexer component, it is also simpler to maintain the crosstalk from the neighbouring wavelength channel at a low level.

In accordance with a preferred embodiment of the invention, the filter unit chain first comprises all drop filter units in succession and thereafter all add filter units in succession. In this way, the level of crosstalk between an added and dropped channel at a given wavelength will be made as low as possible, since said filter units are physically removed from one another.

In accordance with another preferred embodiment of the invention, each added/dropped wavelength channel has a dedicated transmitter/receiver unit. This will increase the modularity of the device and thereby its flexibility in change situations.

An additional advantage of the solution of the invention is that the device can be implemented with simple, inexpensive and reliable components.

BRIEF DESCRIPTION OF THE DRAWINGS

In the following, the invention and its preferred embodiments will be described in detail with reference to FIGS. 4 . . . 6 in examples in accordance with the accompanying drawings, in which.

DETAILED DESCRIPTION OF THE INVENTION

Figure 1A:
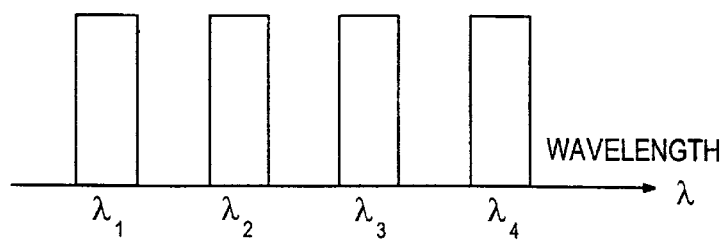
FIGS. 1a and 1b illustrate an optical transmission system using wavelength division multiplexing.
Figure 1B:
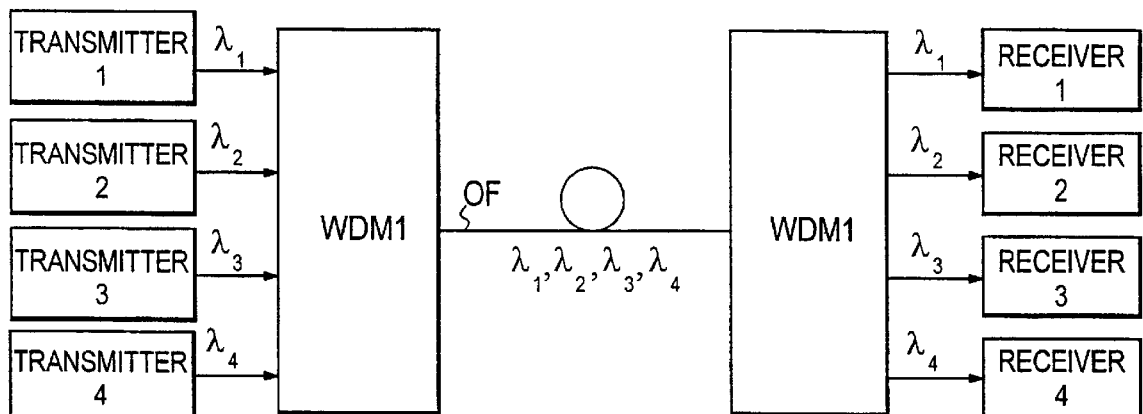
Figure 2:
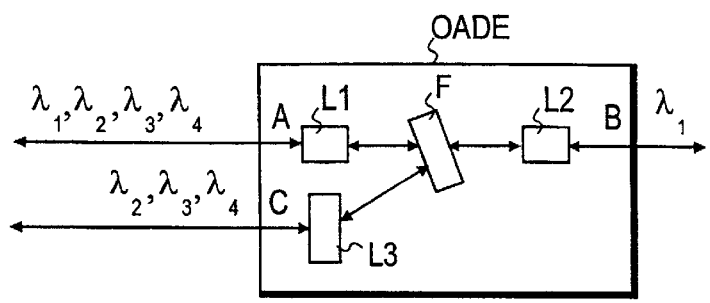
FIG. 2 shows a known add/drop filter that can be used for adding/ dropping one wavelength.
Figure 3:
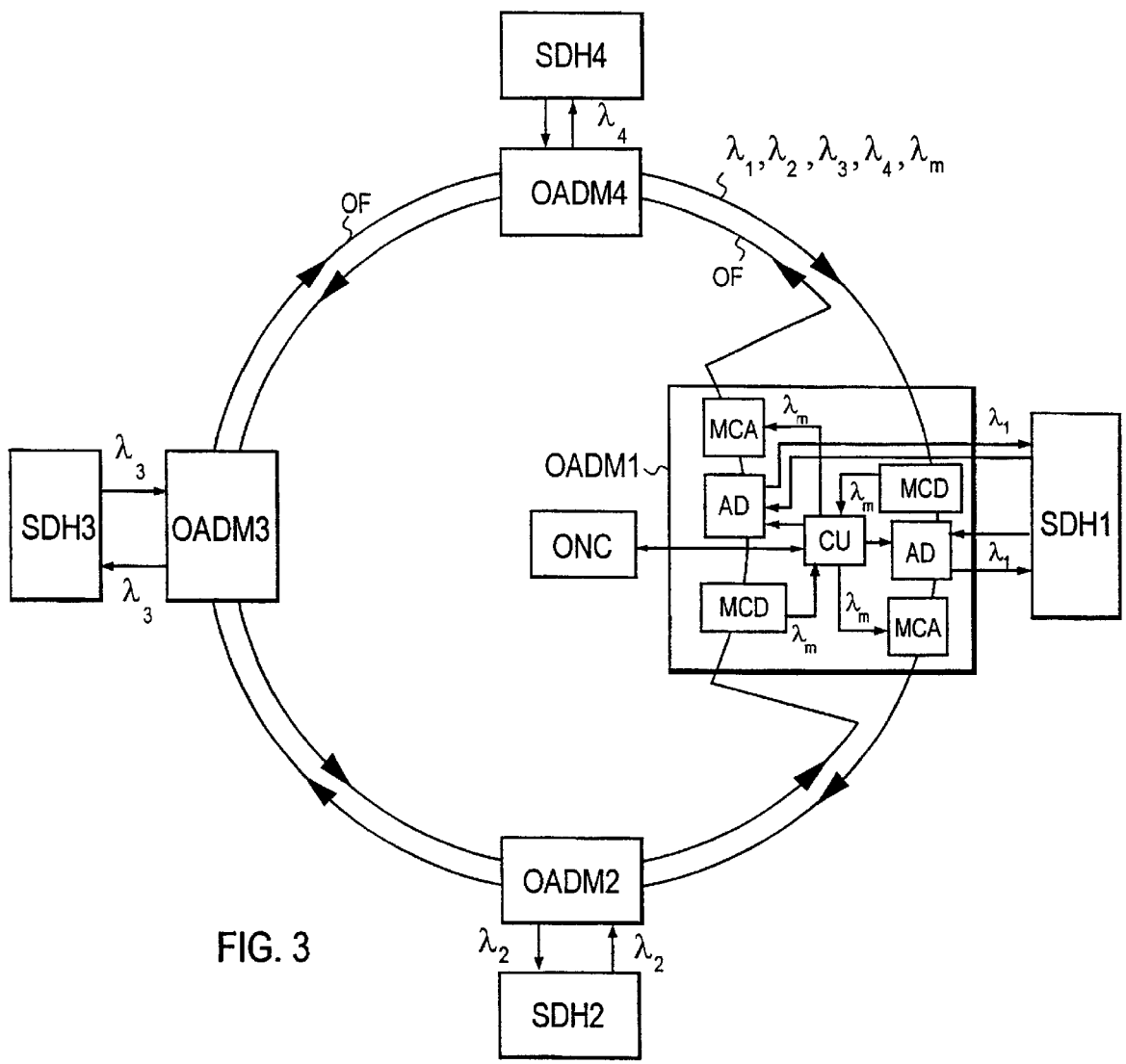
FIG. 3 illustrates a known optical ring network.

The add/drop device of the invention utilizes a three-port filter unit OADE as shown in FIG. 2. The filter unit may be for example an interference-filter-based device of the kind described above, but any similar three-port unit realizing the adding and dropping functions is possible. Such units are placed in succession as a group in which the branched channel of each unit of the same type (dropping or adding) has a specific wavelength value differing from those of other units of the same type.

In the following, an add/drop device of the invention will be described with reference to FIG. 4, using as an example the transmission direction from the left to the right in the figure.

Figure 4:
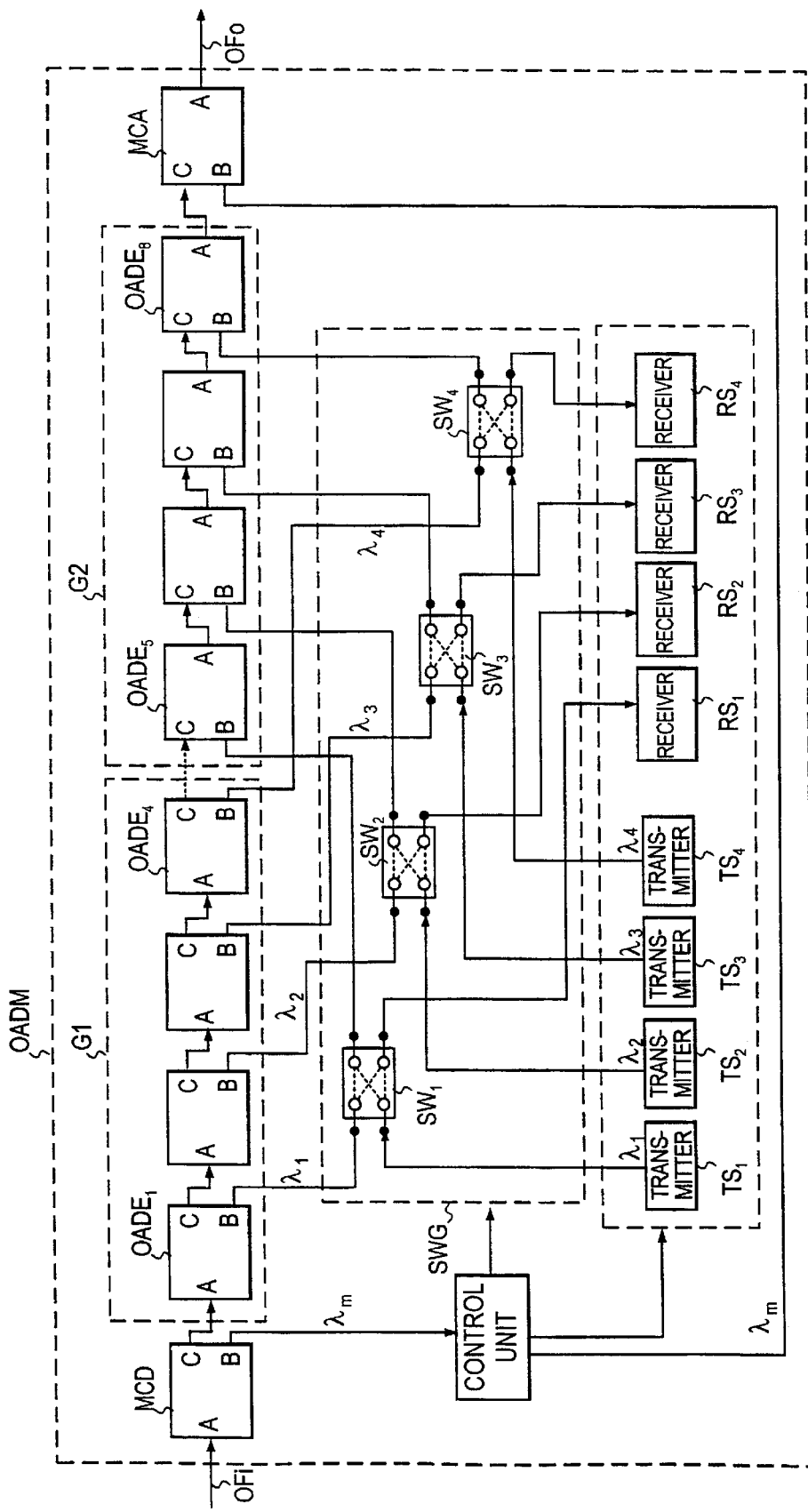
FIG. 4 shows an add/drop device of the invention.

The add/drop device OADM of the invention has a total of 2N filter units OADE, (i=1 . . . 2N) for payload signals, the filter units being grouped in the exemplary case of FIG. 4 in such a way that first N drop filter units are located in succession so as to form a first filter group G1, and thereafter N add filter units in succession so as to form a second filter group G2. In each group, the branched channel of the i:th filter unit has the same wavelength value (in the first filter unit $\lambda_1$, in the second filter unit $\lambda_2$, etc.), since one serves as a drop unit and the other as an add unit at said wavelength. In the case shown in the FIG., N=4, i.e., there is a total of eight filter units, four ($OADE_1 \ldots OADE_4$) on the drop side and four ($OADE_5 \ldots OADE_8$) on the add side.

The optical fibre OFi entering the add/drop device is first connected to a drop element MCD for the management wavelength, which drops the management channel operating at the management wavelength $\lambda_m$ into the control unit CU of the device. The remaining wavelengths are connected to port A of the first filter unit $OADE_1$ of the first filter group G1.

Port C of an individual filter unit of the first filter group is connected to port A of the next filter unit in the group, and port A of an individual filter unit in the second filter group is connected to port C of the next filter unit in the group.

Figure 5A:
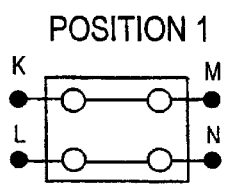
FIGS. 5a and 5b illustrate the two different positions of the switches of the device of FIG. 4.
Figure 5B:
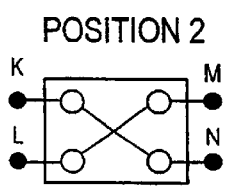

The add/drop device of FIG. 4 also comprises N optical switches $SW_i$ (i=1 ... N), which in this case are known 2×2 switches (2 inputs and 2 outputs). Each switch has a through-connection position in accordance with FIG. 5a, in which the switch switches input K to output M and input L to output N, and a cross-connection position in accordance with FIG. 5b, in which the switch switches input K to output N and input L to output M.

The switches are so configured that in the through-connection position the i:th (i=1 ... N) switch in the switch group (SWG) switches the second port (B) of the i:th filter unit in the first filter group to the second port (B) of the i:th filter unit of the second group, and in the cross-connection position the second port (B) of the i:th filter unit of the first filter group to the receiver means and the transmitter means to the second port (B) of the i:th filter unit of the second filter group.

Furthermore, in accordance with a preferred embodiment of the invention the add/drop device is modular in such a way that a dedicated transmitter $TS_i$ (i=1 ... 4) and receiver $RS_i$ is provided for each wavelength. In the through-connection position of the switch, the transmitter is connected directly to the corresponding receiver.

The add/drop device preferably comprises as many filter unit pairs as the system has wavelength channels (traffic channels) to be transported. In such a case, an arbitrary number of wavelength channels can be selected in each node as dropped/added channels. If it is possible to define in advance from among all wavelength channels a subgroup from which the dropped/added channels can be selected, the number of filter unit pairs can be smaller than the number of wavelength channels to be transported. In the latter case, the first and second filter group are connected in succession by connecting port C of the last filter unit in the first group to port C of the first filter unit of the second group. This connection should preferably be removed to prevent crosstalk if the number of filter unit pairs is equal to the total number of (traffic) wavelength channels to be transported in the system, in which case all wavelength channels pass through the switches.

On the management channel, information is sent on which wavelength channel(s) is(are) desired to be dropped into the node. On this basis, the node control unit CU directs the corresponding optical switches into the cross-connection position, and thus said wavelength channel(s) can be dropped into the corresponding receiver unit(s) $RS_i$, and respectively said wavelength channel(s) can be added from the transmitter unit(s) $TS_i$ among the wavelength channels passing through the device. The control unit supplies the management channel signal to an add filter unit denoted with reference MCA. The drop and add elements for the management channel can be similar filter units as the filter units $OADE_i$ for the traffic channels.

The receiver unit $RS_i$ may be any known unit that is capable of receiving the relevant wavelength and the signal contained therein. The transmitter transmitter unit $TS_i$ can also be implemented in any known manner so that a signal can be sent to a desired filter unit at the wavelength corresponding to that filter unit.

FIG. 4 shows a first embodiment of the add/drop device of the invention, in which the filter units are placed in succession in such a way that first come all drop units and thereafter the add units. The advantage of such an alternative is that crosstalk at a given wavelength is at minimum, as the dropped and added channel are physically as far apart from one another as possible.

Figure 6:
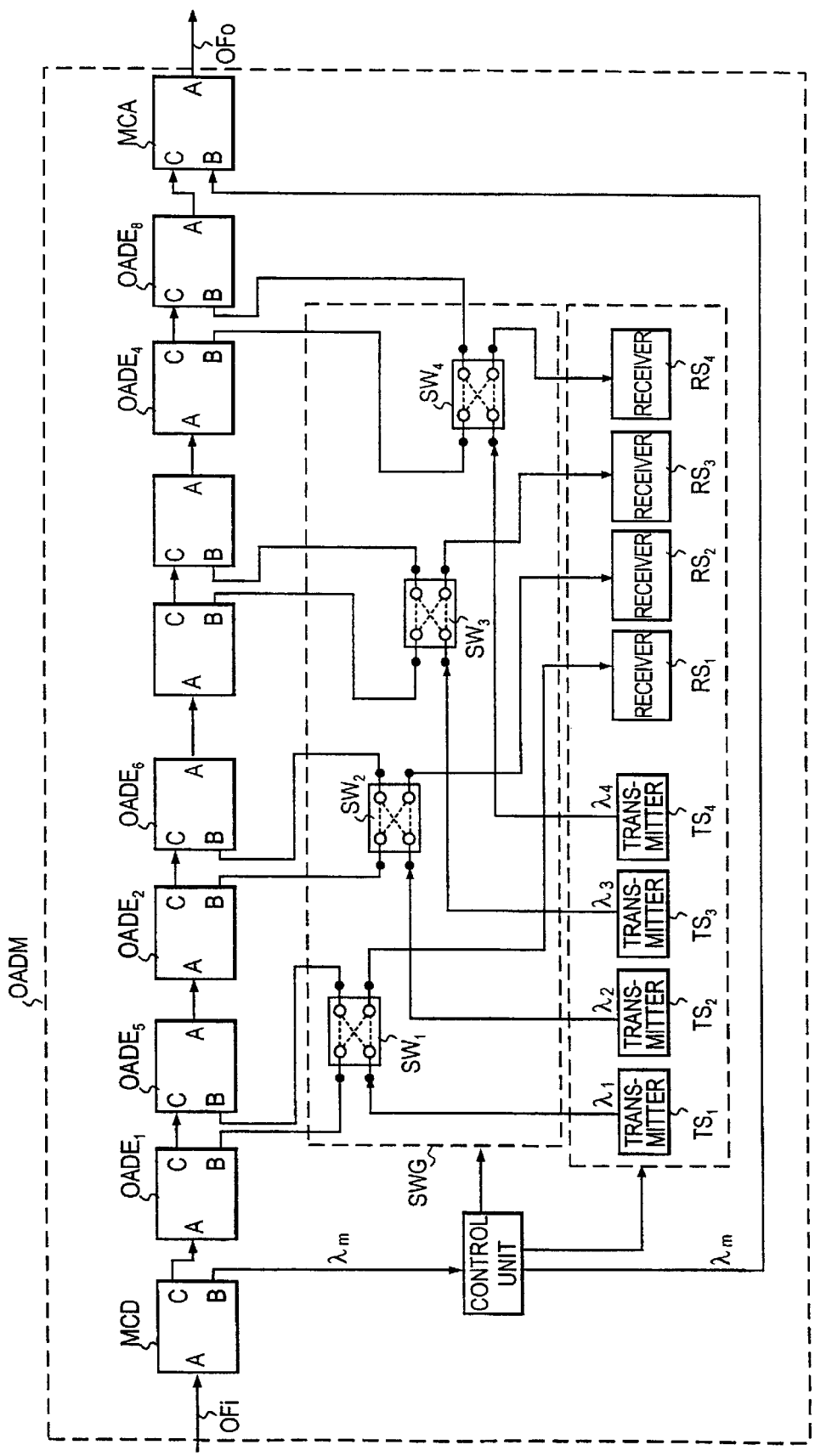
FIG. 6 illustrates an alternative embodiment of the add/drop device of the invention.

FIG. 6 shows an alternative embodiment in which the filter units are placed in a different order in such a way that first comes a drop unit and thereafter the corresponding add unit. Hence, the example of FIG. 6 first shows a drop filter unit $OADE_1$, thereafter the corresponding add filter unit $OADE_5$, thereafter again a drop filter unit $OADE_2$ and the corresponding add filter unit $OADE_6$, etc. The advantage of such an arrangement is that filter unit pairs operating at the same frequency can be directly appended to the end of the chain.

The optical switches are switches known per se, such as electro-mechanical switches. Such switches are manufactured for example by JDS FITEL Inc., Canada. It should be noted that the switches need not necessarily be 2×2 switches, but the same functions can be constructed from larger switches as well. Thus, the size of the switches is not an essential factor, as long as they operate in the above-described manner.

As is apparent from FIGS. 4 and 6, when the solution of the invention is used all signals need not be filtered off at the network node point on the input side of the node and all signals need not be combined on the output side of the node, but only those signals need to be filtered off that are dropped into the node. Moreover, an arbitrary number of the wavelength channels can be dropped into the node. Since the filtering off and combination are not performed within the same demultiplexer/multiplexer component, crosstalk from the neighbouring wavelength channels will also be minute. An additional advantage is that all wavelengths have substantially the same attenuation through the device, particularly when the number of filter unit pairs is equal to the total number of (traffic) wavelength channels transported in the system.

Even though the invention has been described in the following with reference to the examples in accordance with the accompanying drawings, it is obvious that the invention is not restricted thereto, but it can be modified within the scope of the inventive idea set forth in the appended claims. For example, several optical fibres can run in parallel. In principle, it is also possible that a channel at a given wavelength is dropped into the node but no channel is added or a channel at a different wavelength is added, or that a channel is added from the node but no channel is dropped. Very often the equipment also includes an optical amplifier that amplifies the input and output signal.

What is claimed is:

1. An optical add/drop device for a telecommunications system, in which telecommunications system an aggregate signal comprising several signals, each of which is transmitted at its dedicated wavelength, is transmitted on an optical fibre using wavelength division multiplexing, said add/drop device comprising:

an optical filter unit (OADE) that is bidirectional so that it can operate as a signal dropping unit filtering off from the incoming aggregate signal a predetermined narrow wavelength band including the desired signal, or as a signal adding unit adding to the outgoing aggregate signal a narrow wavelength band including the desired signal, said individual filter unit comprising a first, second and third port so that when all signals of the aggregate signal are present at the first port (A), said desired signal is present at the second port (B) and all other signals except the desired signal are present at the third port (C), a transmitter for connecting the desired narrow wavelength band to the filter unit, a receiver for receiving the narrow wavelength band filtered by the filter unit, a number of filter units ($OADE_1 \ldots OADE_8$) are placed in succession to form at least two pairs of filter units in such a way that in each pair the first filter unit operates as a signal dropping unit at a given wavelength and the second as an adding unit corresponding to the first unit, adding to the aggregate signal a signal having the same wavelength, the device comprises for each pair an optical switching element having at least two positions and being connected to the filter units of the corresponding pair in such a way that in its first position it connects the second port (B) of the drop filter unit to the second port (B) of the corresponding add filter unit, and in its second position the transmitter to the second port (B) of the add unit and the receiver to the second port (B) of the drop unit, a first filter group comprising N filter units ($OADE_1 \ldots OADE_4$) placed in succession in such a way that the third port (C) in the filter unit is connected to the first port (A) of the next filter unit in the group, a second filter group comprising N filter units ($OADE_5 \ldots OADE_8$) placed in succession in such a way that the first port (A) in the filter unit is connected to the third port (C) of the next filter unit in the group, and a switch group comprising N switching elements, the switching elements of said group being connected in such a way that in its first position the i:th (i=1 ... N) switching element in the group couples the second port (B) of the i:th filter unit in the first filter group to the second port (B) of the i:th filter unit in the second group, and in its second position the second port (B) of the i:th filter unit in the first filter group to the receiver and the transmitter to the second port (B) of the i:th filter unit in the second filter group.

2. The add/drop device as claimed in claim 1, wherein the number of wavelengths transported in the system is also N, the filter units of the first and second group being coupled to each other only through switching elements when the switching elements are in their first position.

3. The add/drop device as claimed in claim 1, wherein the number of wavelengths transported in the system is smaller than N, whereby the third port (C) of the last filter unit in the first group is coupled to the third port (C) of the first filter unit in the second group.

4. The add/drop device as claimed in claim 1, wherein the filter units are connected in succession in such a way that a filter unit serving as a drop unit at a given wavelength is followed by a filter unit serving as an add unit at the same wavelength, the third port (C) of the drop unit being coupled to the third port (C) of the next filter unit, and the switching element in its first position switching the second port (B) of the drop unit to the second port of the next filter unit.

5. The add/drop device as claimed in claim 1, wherein there is a dedicated receiver unit for each drop unit and a dedicated transmitter unit for each add unit.

6. The add/drop device as claimed in claim 1, wherein a filter unit (MCD) dropping the management channel of the telecommunications system is disposed ahead of the filter units and a filter unit (MCA) adding the management channel is disposed after the filter units.

* * * * *